(12) United States Patent
Giesler et al.

(10) Patent No.: US 6,969,236 B2
(45) Date of Patent: Nov. 29, 2005

(54) FLUID-COOLED MECHANICAL FACE SEAL ROTOR

(75) Inventors: William L. Giesler, Phoenix, AZ (US); Todd A. Langston, Chandler, AZ (US); Kellan P. Geck, Chandler, AZ (US); Todd A. Kincheloe, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 86 days.

(21) Appl. No.: 10/651,926

(22) Filed: Aug. 29, 2003

(65) Prior Publication Data

US 2005/0047912 A1 Mar. 3, 2005

(51) Int. Cl.$^7$ .............................................. F01D 25/00
(52) U.S. Cl. ...................................... 415/230; 415/231
(58) Field of Search ................................ 415/230, 231; 277/597, 930, 423, 424

(56) References Cited

U.S. PATENT DOCUMENTS

| | | | |
|---|---|---|---|
| 3,499,653 A | | 3/1970 | Gardner |
| 3,813,103 A | * | 5/1974 | Wiese ........................ 277/401 |
| 4,123,089 A | | 10/1978 | Sato |
| 4,423,879 A | | 1/1984 | Takenaka et al. |
| 4,836,561 A | | 6/1989 | Lebeck et al. |
| 4,887,395 A | | 12/1989 | Lebeck et al. |
| 4,889,348 A | | 12/1989 | Amundson et al. |
| 5,090,712 A | | 2/1992 | Pecht et al. |
| 5,143,384 A | | 9/1992 | Lipschitz |
| 5,174,584 A | | 12/1992 | Lahrman |
| 5,217,233 A | | 6/1993 | Pecht et al. |
| 5,639,096 A | * | 6/1997 | Ullah ........................ 277/401 |
| 5,702,110 A | * | 12/1997 | Sedy ........................ 277/400 |
| 5,941,532 A | | 8/1999 | Flaherty et al. |
| 6,257,589 B1 | | 7/2001 | Flaherty et al. |
| 6,623,238 B2 | * | 9/2003 | Langston et al. ........... 415/112 |

FOREIGN PATENT DOCUMENTS

WO PCT/US2004/028042  4/2005

OTHER PUBLICATIONS

B. M. Steinetz; R. C. Hendricks; J Munson; Advanced Seal Technology Role in Meeting Next Generaton Turbine Engine Goals; NASA/TM-1998-206961; AVAT-PPS Paper No. 11; NATO Research and Technology Agency; Toulouse, France, May 11-15, 1998.

* cited by examiner

Primary Examiner—Ninh H. Nguyen
(74) Attorney, Agent, or Firm—Ingrassia Fisher & Lorenz (57) ABSTRACT

A fluid-cooled seal rotor is described for a seal assembly that includes a seal case, a seal stator, and wherein the rotor has a sealing face on a first side and a heat-transfer structure on a second side. The heat-transfer structure may be a roughened surface. The heat-transfer structure may have protrusions which may be fins, including fins with roughened surfaces. The heat-transfer structure may have additional heat-transfer structures thereon to create complex, including fractal, structures. The fins may be shaped as impellers to move oil over the heat-transfer structure. Channels between fins may have a width greater than twice the boundary layer thickness for the fluid engaged by the fins. The fluid-cooled rotor, the seal assembly having the fluid-cooled rotor, an air turbine starter having the seal assembly, air turbine starters and other machines with rotating shafts using the seal are within the scope of the invention.

41 Claims, 11 Drawing Sheets

FLUID-COOLED MECHANICAL FACE SEAL ROTOR

FIELD OF THE INVENTION

The present invention relates to gas turbine engines and, more particularly, to a fluid-cooled seal rotor used in gas turbine engines, gas turbine engine starters, and auxiliary power units, that provides lower seal face temperatures and increased wear life compared to presently known seals.

BACKGROUND OF THE INVENTION

Many relatively large turbine engines, including turbofan jet engines, may use an air turbine starter (ATS) to initiate their rotation. The ATS is mounted by the jet engine, much as a starter for an automobile is located by the automobile's engine. The ATS may be coupled to a high pressure fluid source, such as compressed air, which impinges upon the turbine wheel in the ATS causing it to rotate at a relatively high rate of speed. The ATS includes an output shaft that is coupled, perhaps via one or more gears, to the jet engine. The output shaft rotation in turn causes the jet engine to begin rotating. The applicant for the present invention, Honeywell International, Inc., has for years successfully designed, developed and manufactured ATSs.

The ATS turbine wheel output shaft may be rotationally mounted within a housing using one or more bearing assemblies. The bearing assemblies, as well as the above noted gears, may be supplied with a lubricant, such as oil. Thus, the ATS may be mounted within a housing that is divided into at least two sections, the turbine section and the output section. The turbine section houses the turbine wheel and includes one or more passages through which the high pressure fluid source passes and impinges upon the turbine wheel, causing the turbine wheel to rotate. The output section, or gearbox, may house the turbine wheel output shaft, the gears, the bearing assemblies, and various other mechanical devices that utilize a lubricant. A seal assembly may be provided between the turbine section and output section of the ATS to substantially inhibit the lubricant used in output section from leaking out of the output section into the turbine exhaust section.

The seal assembly may be a face seal that includes a rotor, a stator, and a seal case. The rotor is mounted on the turbine wheel shaft and, thus, rotates with the turbine shaft, and has an axially facing flange, or sealing face, that extends radially away from shaft. The seal case is mounted to the ATS housing in the turbine section and surrounds the turbine wheel output shaft. The stator is housed within the seal case and sealingly engages the axially facing flange of the rotor. The rotor and stator flat annular faces sealingly engage under a biasing force imposed by a biasing mechanism in the seal case.

Face seal stators with carbon faces are known to be used as seals in engines, including air-turbine engines and air turbine aircraft engine starters. Carbon-stator face seals encounter high-temperature loads caused by friction between the carbon stator sealing face and the rotor face, which may be metal. Heat may cause the oil on the seal rotor and stator to solidify into coke as a result of the high temperatures at the face. The coke accumulations may compromise face seal performance and limit face seal life. Compromise of a face seal can result in sufficient loss of lubrication to the bearings, gears, and other lubricated components in the air turbine starter gearbox to cause damage to these components. It should be appreciated that ATS's with the above design are nonetheless safe for their intended use.

Carbon-stator face seals may additionally incorporate other technologies such as film-riding face geometries (Rayleigh, Spiral, and wave designs) as discussed in NASA/TM-1998-206961 AVT-PPS Paper No. 11 "Advanced Seal Technology Role in Meeting Next Generation Turbine Engine Goals". Various film-riding echnologies are known in the art, and generally include shaped configurations of the sealing surfaces of either the stator or the rotor. The shaping of the sealing surface is specific to the task of maintaining a film of a fluid between the stator and rotor sealing surfaces to minimize friction while maintaining a seal. The fluid used may be, for example, air, oil, or an air-oil mixture.

Hence, there is a need for a seal assembly that reduces the rate and likelihood of coke accumulation between the stator sealing face and the seal rotor face, thereby reducing the likelihood of loss of lubrication to rotating components within the starter gearbox. The present invention addresses this need.

SUMMARY OF THE INVENTION

The present invention provides a seal assembly that reduces the rate and likelihood of coke accumulation on carbon face seals between the carbon-face stator and the metal-face rotor and on the stator ring and rotor outside of the contact face.

In one embodiment of the present invention, and by way of example only, an air turbine starter includes a housing having a fluid inlet port, a fluid outlet port, and a fluid flow passage extending therebetween; a turbine wheel having a turbine shaft rotationally mounted within the housing, the turbine wheel further having at least two turbine blades extending radially into the fluid flow passage; and a seal assembly mounted in the housing. The seal assembly includes: a seal case mounted on the housing; a seal stator mounted within the seal case, the seal stator having at least a first face and a second face; a seal rotor mounted on the turbine shaft, said seal rotor having a first side adapted to sealingly engage said seal stator first face and a second side having at least a partially roughened surface and one or more fins thereon.

In another exemplary embodiment, a seal assembly is disclosed for sealing an opening through which a rotating shaft extends, the seal assembly comprising a seal case mounted proximate the opening; a seal stator mounted within the seal case, the seal stator having at least a first face and a second face; and a seal rotor assembly adapted to be mounted on the rotating shaft, the seal rotor assembly having a first side adapted to sealingly engage said seal stator first face and a second side having at least a partially roughened surface and one or more fins thereon.

In yet another exemplary embodiment, a rotor for a face seal having a stator is disclosed, comprising a substantially annular body having a first side and a second side, the first side adapted to sealingly engage a face of the stator and one or more fins and at least a partially roughened surface on the second side of the body.

In still yet another exemplary embodiment, an apparatus is disclosed having a shaft rotationally mounted therein and extending between a first volume and a second volume, the apparatus comprising a web disposed between the first and second volumes, the web having an opening through which the shaft extends; a seal stator mounted on the web proximate the opening; and a seal rotor, mounted on the shaft and disposed at least partially within the first volume and proximate the opening, the seal rotor having a first side adapted to sealingly engage the seal stator and a second side having one or more fins and at least a partially roughened surface.

In an exemplary embodiment of a method of modifying an air turbine starter, an air turbine starter including a housing, a turbine wheel having a turbine shaft rotationally mounted within the housing, a seal rotor mounted on the turbine shaft, and a seal stator assembly mounted to the housing and surrounding the shaft and having at least a portion thereof sealingly engaging a face of the seal rotor, the method comprising removing the seal rotor from the turbine shaft; and mounting a new seal rotor on the turbine shaft, wherein the new seal rotor assembly includes said seal rotor having a first side adapted to sealingly engage said seal stator first face and a second side having at least a partially roughened surface and one or more fins thereon.

In other aspects of the present invention, one or more of the above elements can be used in a gas turbine engine, or other apparatus having a rotating shaft.

Other independent features and advantages of the preferred seal assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the present invention is not limited to use in conjunction with a specific type of rotating machine. Thus, although the present invention is, for convenience of explanation, depicted and described as being implemented in an air turbine starter, it should be appreciated that it can be implemented in numerous other rotating machines including, but not limited to, a gas turbine engine, a gas turbine auxiliary power unit (APU), a turbo-charger, an air cycle machine, a hydraulic pump, a water pump, or various other chemical and industrial pumps and other rotating machinery.

Figure 1:
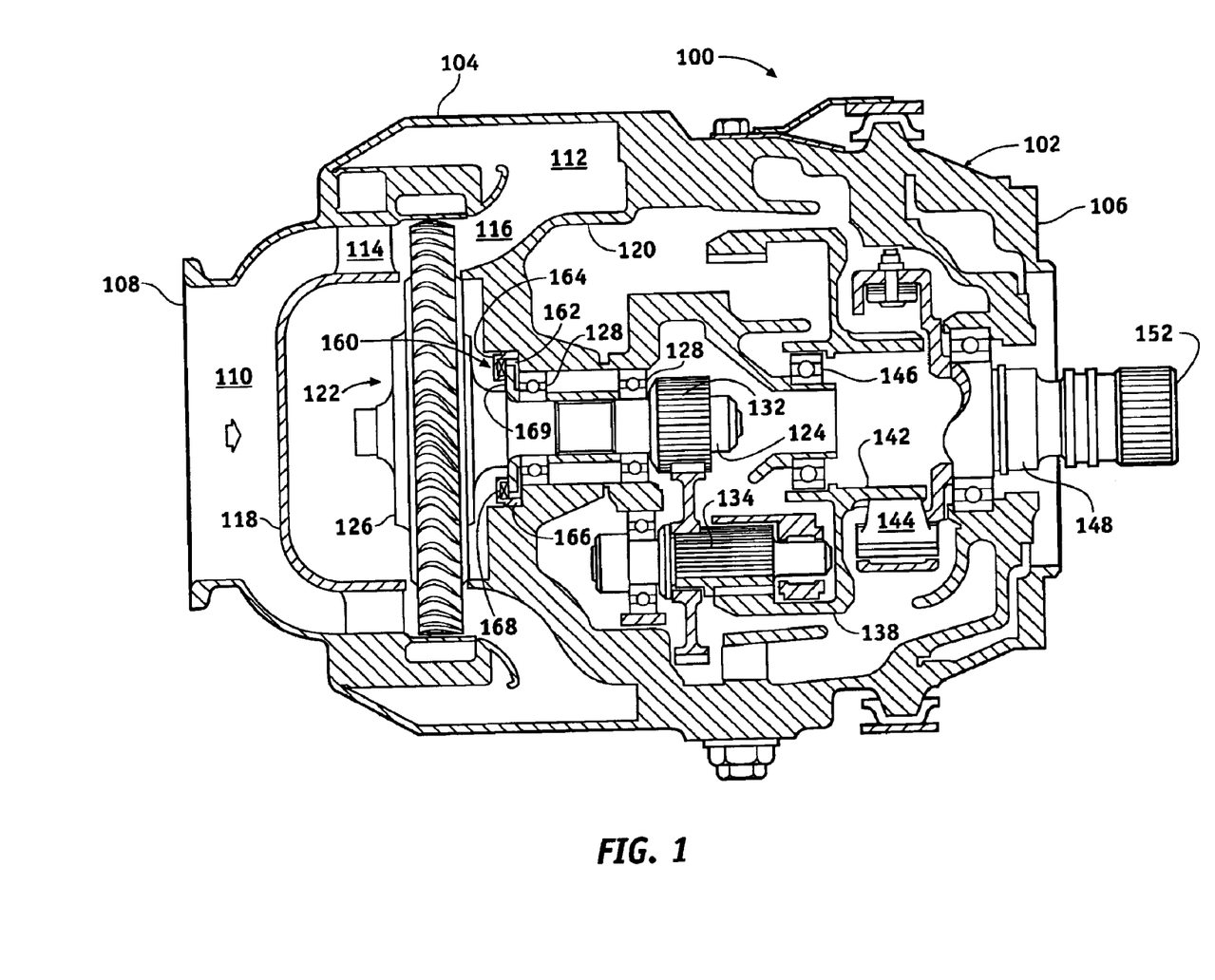
FIG. 1 is a cross section view of an exemplary air turbine starter that may use the seal assembly of the present invention.

Turning now to the description, a cross-sectional view of an exemplary air turbine starter (ATS) that is used to initiate the rotation of a larger turbine, such as a turbofan jet engine, is depicted in FIG. 1. The ATS 100 is enclosed within a housing assembly 102 that includes at least a turbine section 104 and an output section 106. The housing assembly 102 may be made up of two or more parts that are combined together or may be integrally formed as a single piece. The housing assembly 102 includes an inlet plenum 108, which directs compressed air into the housing assembly 102. The compressed air received at the plenum 108 flows through an annular flow passage 110 and out a radial outlet port 112. The annular flow passage includes an axial flow portion 114 and a substantially curved radial flow portion 116. The axial flow portion 114 is formed through a stator assembly 118 that is mounted within the housing assembly turbine section 104 proximate the fluid inlet port 108. The radial flow portion 116, which flares the annular flow passage 110 radially outward, is formed between a portion of the housing assembly turbine section and an exhaust housing 120 that is mounted within the housing assembly 102.

A turbine wheel 122 is rotationally mounted within the housing assembly turbine section 104. In particular, the turbine wheel 122 has a shaft 124 that extends from a hub 126, through the exhaust housing 120, and into the housing assembly gearbox 106. The turbine wheel output shaft 124 is rotationally mounted in the housing assembly gearbox 106 by bearing assemblies 128. A gear 132 is coupled to the turbine wheel output shaft 124, and meshes with a compound planetary gear train 134. The compound planetary gear train 134 engages a ring gear 138 and a hub gear 142, which is in turn coupled to an overrunning clutch 144. During operation of the ATS 100, this gearing configuration converts the high speed, low torque output of the turbine wheel output shaft 124 into low speed, high torque input for the overrunning clutch 144.

The overrunning clutch 144, as noted above, is coupled to the hub gear 142, which is supported by another bearing assembly 146. A drive shaft 148 extends from the overrunning clutch 144, through the turbine housing output section 106, and is coupled to a turbine output shaft 152. The output shaft 152 may be coupled to, for example, a turbofan jet engine gearbox (not illustrated).

A face seal assembly 160 provides a fluid-tight seal between the rotating turbine wheel 126 and the fluids, such as air, inside of the housing assembly turbine section 104 and the lubricant, such as oil, in housing assembly gearbox 106. The face seal assembly 160 includes a rotor assembly 162, and a stator seal assembly 164 that includes a seal case 166 and a seal stator ring 168. The rotor assembly 162 is mounted on the turbine wheel shaft 124, and has an axially facing flange 169 that extends radially outwardly away from the turbine wheel output shaft 124. The seal case 166 is mounted to the exhaust housing 120 and surrounds the turbine wheel output shaft 124. The seal stator ring 168 is housed within the seal case 166 and sealingly engages the axially facing flange 169 of the rotor assembly 162, providing the fluid tight seal between the rotating turbine wheel output shaft 124 and the fluids held inside of the turbine housing section 104 and gearbox 106. Though not explicitly depicted, it should be appreciated that another face seal assembly 160 may also be included in the ATS 100 that seals the turbine output shaft 152.

Figure 2:
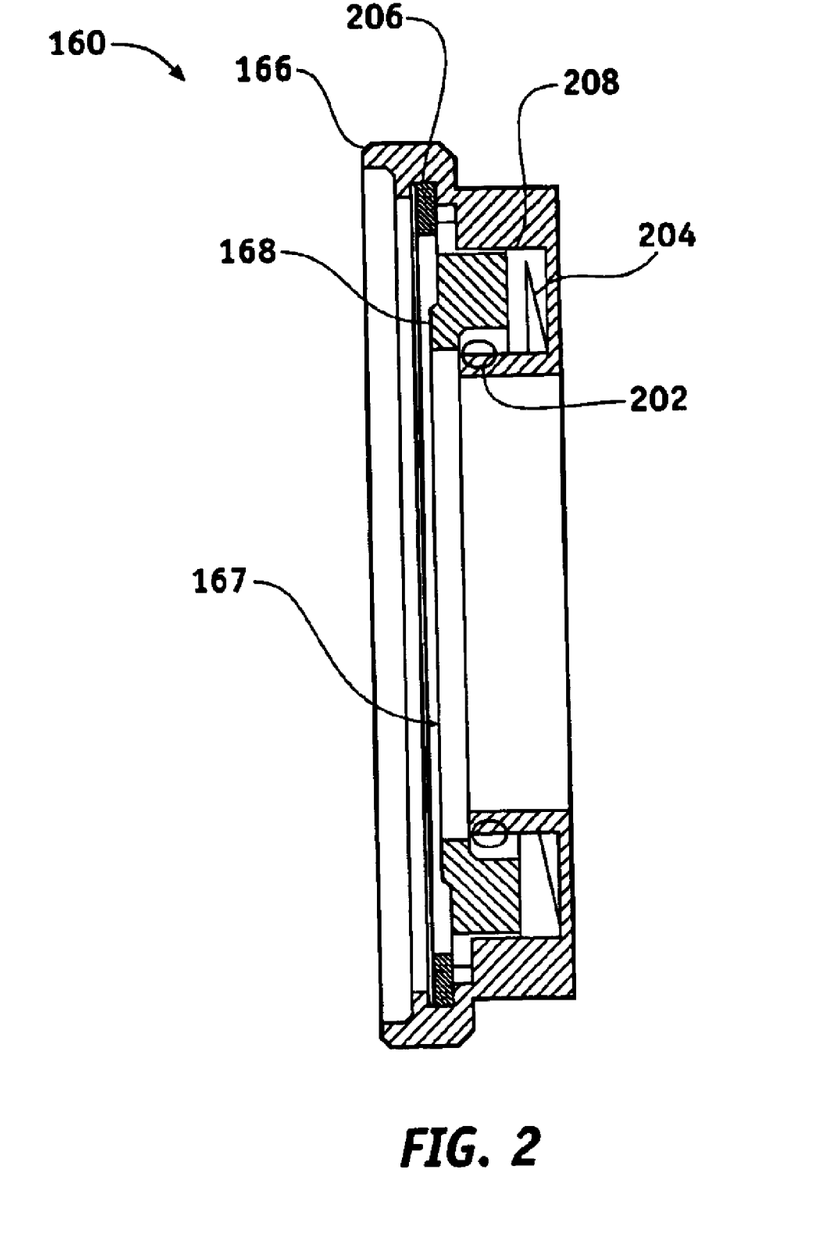
FIG. 2 is a view of an exemplary seal stator assembly according to an embodiment of the present invention.

An exemplary embodiment of the seal stator assembly 160 is shown in cross section in FIG. 2 and will now be described. The seal stator assembly 160 includes the seal case 166, the seal stator ring 168, an O-ring 202, a spring washer 204, a retaining ring 206, and may additionally include a seal washer 208. Seal stator ring 168 includes a flat annular face, or sealing face 167, which sealingly engages seal rotor assembly 162. Seal stator ring 168 is mounted against rotation in seal case 166 and is preferably biased to contact rotor assembly 162 by spring washer 208. Retaining ring 206 retains seal stator 168 in seal case 166, and O-ring 202 seals the junction of the seal stator 168 and the seal case 166. Seal case 166 is mounted against rotation in the housing proximate an opening through which shaft 124 extends. Other stators are known in the art and may be used with the seal rotor 162 of the present invention. The stator sealingly engages the seal rotor assembly 162 by rotationally sliding contact between the stator flat annular face 167 and an annular portion, or sealing surface 306 (FIG. 3A), of the rotor 301 of FIG. 3A, which is fixed to the rotating shaft. In some alternate embodiments, the stator 164 sealingly engages the seal rotor assembly 162 by riding a fluid film, such as an air film, between the stator flat annular face 167 and a sealing surface 306 adapted for film-riding. In other alternate embodiments, the stator sealing face 167 sealingly engages the seal rotor assembly 162 by riding a fluid film between the sealing surface 306 and the stator face 167 which is adapted for film-riding.

Figure 3A:
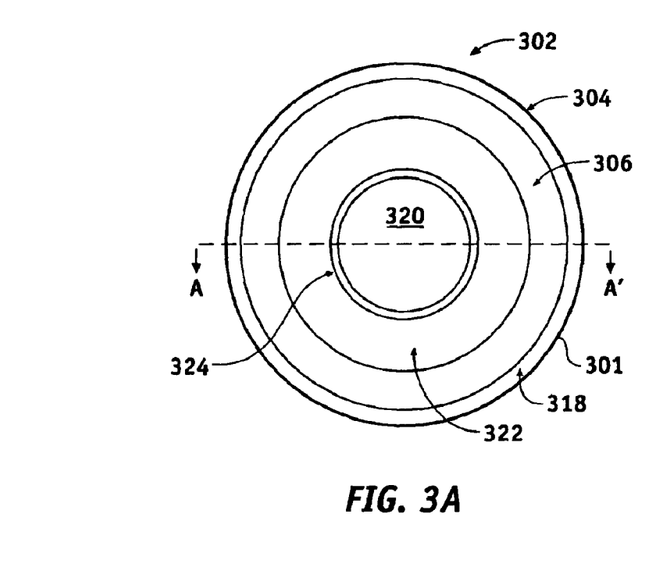
FIG. 3A is a view of an exemplary first side of a seal rotor.
Figure 3B:
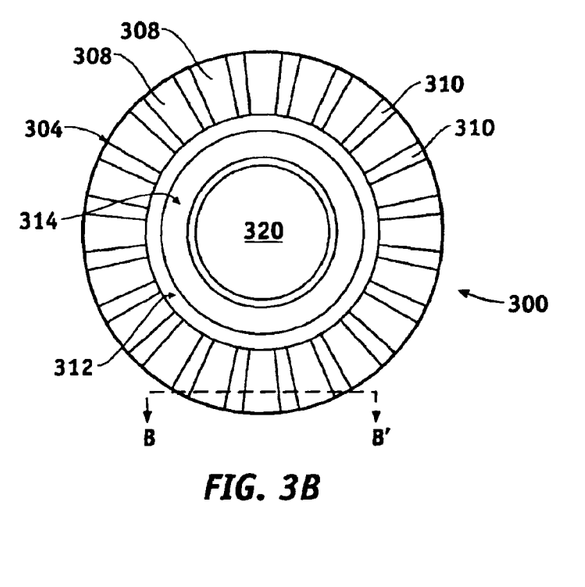
FIG. 3B is a view of an exemplary second side of the seal rotor having a heat-transferring structure having linear impeller fins.

FIGS. 3A and 3B show an exemplary rotor assembly 162 first and second sides, respectively. As illustrated therein, the rotor assembly 162 includes a main rotor, or body, 301, which has a first side 302, a second side 300, and a central opening 320 for mounting the rotor assembly 162 on the turbine shaft 124. The rotor assembly 162 is shown as an annulus and the central opening 320 is shown as being circular. It will be appreciated that, in some embodiments, the central opening 320 need not have a circular cross-section and the rotor assembly 162 need not be an annulus. Rotor 301 also has a circumferential arc that is illustrated as a 360-degree arc co-extensive with outer peripheral surface 304 in FIGS. 3A and 3B. Fins 308 and channels 310 may be spaced apart in reference to the circumferential arc. Chord lengths, or angles subtended by chords may also be used for defining spacing for fins 308 and channels 310. Preferably, the void space created by sum of the channels 310 comprises between one percent and eighty percent of the circumferential arc.

Figure 3C:
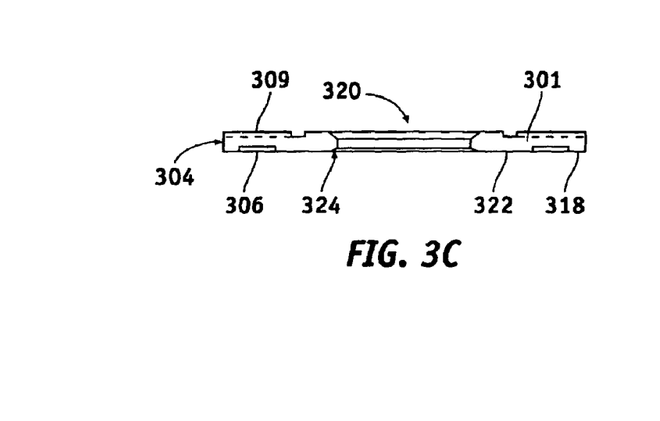
FIG. 3C is a view of a cross section of the seal rotor
Figure 3D:
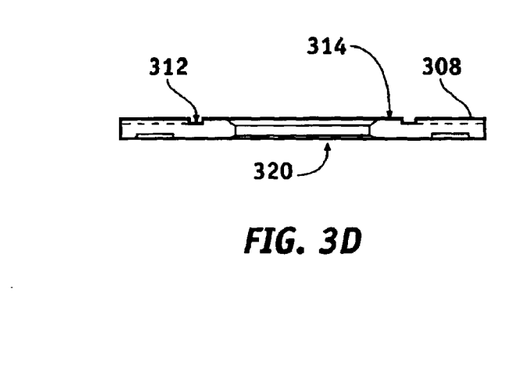
FIG. 3D is a view of a cross section of the seal rotor

No matter the particular shape, at least a portion 306 of the rotor assembly first side 302 is adapted to sealingly engage the seal stator 160. Hence, in the depicted embodiment, the rotor assembly first side 302 is substantially flat, as shown in FIGS. 3C and 3D, which are cross sections A–A' through the rotor 301 of FIGS. 3A and 3B. However, it will be appreciated that the first side 302 may alternatively include a sealing surface 306 that extends axially away from the first side 302, and that additionally extends radially to a dimension to appropriately engage the seal stator 160. The sealing surface 306 may be a different material than rotor 301. For example, a chromium sealing surface 306 may be used on an steel alloy rotor 301. The sealing surface 306 of the rotor 301 may be adapted for generating a film between the rotor sealing surface 306 and the seal stator face 167 for film-riding, as is known in the art.

The rotor assembly second side 300 may include a bearing engagement surface 314 which circumscribes the opening 320 and extends axially from the rotor assembly second side 300. The bearing engagement surface 314 may engage, for example, a portion of the bearing assembly 128 depicted in FIG. 1. In some embodiments, the bearing engagement surface 314 may be omitted.

Figure 19:
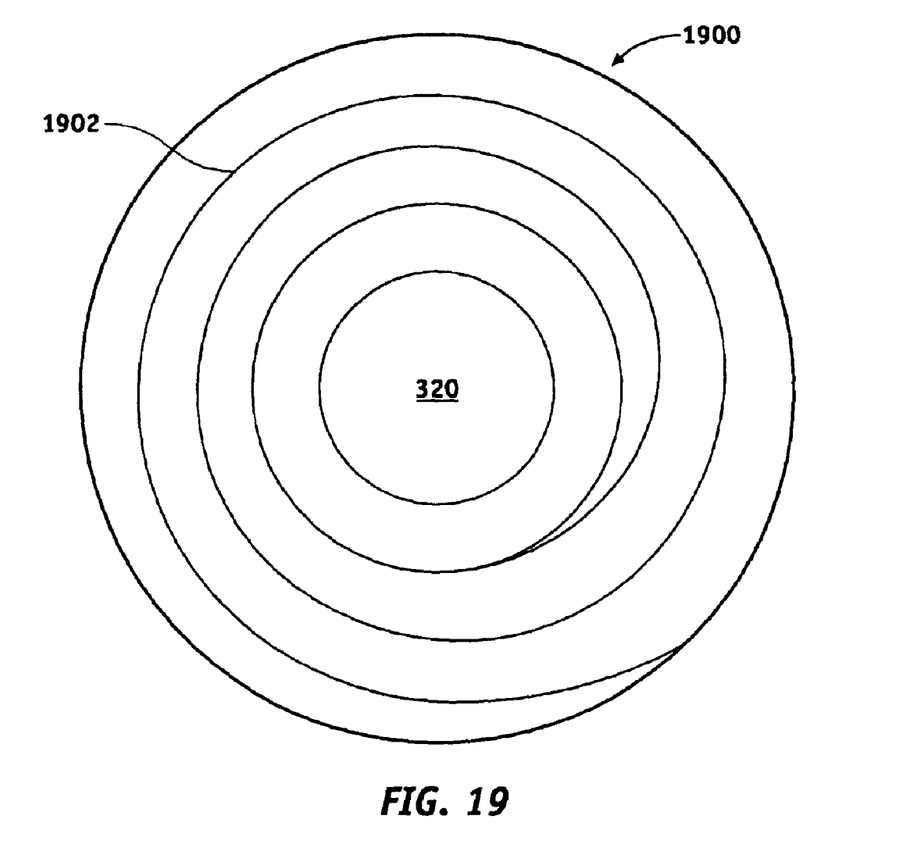
FIG. 19 is a view of still another exemplary second side of the seal rotor having a heat-transferring structure having a single start thread.

The fin or fins 308 are preferably formed by machining radial channels 310 into the into the rotor assembly second side 300, though it will be appreciated that various other methods and/or processes may be used to form the fins 308. It will additionally be appreciated that the fins 308 could be separate structures, or part of a separate structure, that is coupled to the rotor assembly second side 302. The fins 308 improve the heat transfer capacity of the rotor assembly by providing additional heat transfer surface. In addition, the fins 308 are preferably configured to impel motion of a fluid over the surface of rotor assembly second side 302 and the fins 308 thereon. As such, heat transfer from the seal stator 160, through the seal rotor 162, to the impelled fluid is further improved. In an alternate embodiment (not shown in FIG. 3B), a single fin may be used. For example, a spiral fin 1902 as shown in FIG. 19 may serve as a heat transfer structure.

Radial channels 310 are configured to comprise, in sum, between one and eighty percent, inclusive, of the circumferential arc of rotor second side 300 along at least the outer edge of the rotor 301. The void space created by channels 310 is preferably measured along the circumferential arc coextensive with the outer peripheral surface 304 of rotor 301. Void spaces in the range of one percent and eighty percent are preferred. Radial variation of the void space is included in the present invention (See FIG. 6, for example).

In addition to including a plurality of fins 308, at least a portion of the rotor assembly second side 302 is roughened. It will be appreciated that either, or both, the channels 310 and the fins 308 may be roughened, and that all or a portion of the channels 310 and fins 308 may be roughened. In a particular preferred embodiment, substantially the entire rotor assembly second side 302, except for bearing engagement surface 314 but including both the fins 308 and the channels 310, is roughened. By roughening at least a portion of the surface of the rotor assembly second side 302, the heat transfer surface area of the rotor assembly second side 302 is further increased. The roughened surface additionally increases the thickness of the fluid boundary layer at the fin or surface trailing tip which may increase heat transfer by heating more of the fluid flowing past the fin surface area. Thus, the heat transfer capability of the rotor assembly 162 is further improved.

At the same time, the roughened surface increases the thickness of the boundary layer adjacent to channel 310 and fin 308 surfaces. The thickness of this boundary layer can be determined, in each case, based upon the fluid properties, the fin 308 geometry, and the velocity of the fin 308 through the fluid. Because of the boundary layers on the channel 310 surfaces, the width of each channel 310 is preferably more than twice the thickness of the boundary layer.

The rotor assembly second side 302 may be roughened using any one of numerous methods and processes. For example, some or all of the rotor assembly second surface 302 may be roughened using heat treatment processing, acid etching, electrostatic plating, sputtering, plasma spray, HVOF (High Velocity Oxygen Fuel), coating, laser marking, bead blasting, and grit blasting. The skilled artisan will recognize that, depending on the particular process/method used, the rotor assembly second side 302 may be roughened by removing some material from, or by adding some material to, the surface of the rotor assembly second side 302. In some embodiments, the roughening process may be controlled such that the roughened surface forms a fractal pattern. The roughness magnitude of the rotor assembly second side 302 may vary depending upon, for example, the properties of the fluid to which the rotor assembly second side 302 is exposed, and the speed at which rotor assembly 162 will rotate. In a particular preferred embodiment, the rotor assembly second side 302 is preferably roughened to a surface roughness Ra of greater than 125 micro-inches. Nonetheless, it will be appreciated that the determination of the proper roughness may be made in each particular case to optimize the heat transfer characteristics of the rotor assembly 162.

In the depicted embodiment, the rotor assembly second side 302 additionally includes an annular well 312, which is formed proximate, and substantially circumscribes, the bearing engagement surface 314. It will be appreciated that in some embodiments the annular well 312 may be omitted. It will additionally be appreciated that, although the annular well 312 is shown as having a rectangular cross section, other cross sectional shapes are also contemplated. For example, a "V" or "U"-shaped groove or a shape adapted for conducting fluid into channels 310 between fins 308 may be used. The annular well 312 may additionally comprise heat-transfer features including, without limitation, roughening, machined surfaces, and thermally conductive coatings. For example, the interior axially-aligned walls of annular well 312 may be threaded to impel fluid into the bottom of the well in response to rotation of the rotor assembly 162, the fluid so impelled finding its path outward through channels 310, and the threads may be roughened to improve heat transfer to the impelled fluid.

Figure 4:
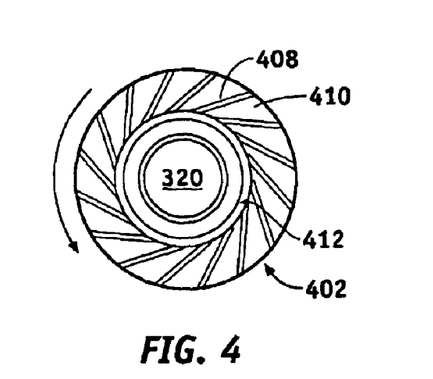
FIG. 4 is a view of another exemplary second side of the seal rotor having a heat-transferring structure having slanted impeller fins.
Figure 5:
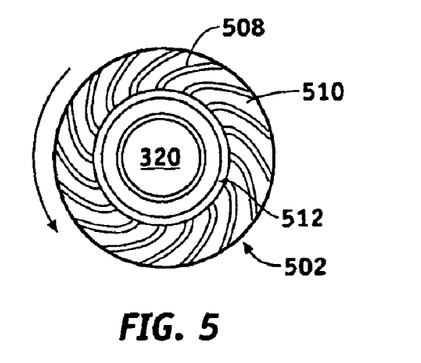
FIG. 5 is a view of yet another exemplary second side of the seal rotor having a heat-transferring structure having arcuate impeller fins.
Figure 6:
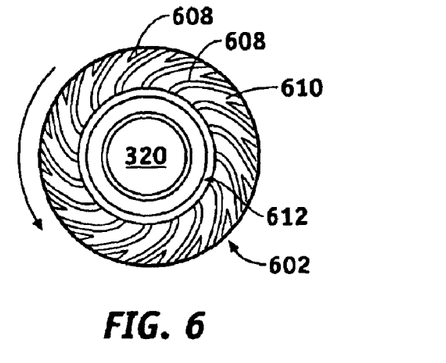
FIG. 6 is a view of still another exemplary second side of the seal rotor having a heat-transferring structure having arcuate impeller fins of different sizes.

In FIG. 3B, the fins 308 are depicted as being of equal size and radial orientation. It will be appreciated, however, that fins 308 may be of different sizes and different configurations. Exemplary and non-limiting alternative configurations are shown in FIGS. 4–6. For example, in FIG. 4, fins 408 on rotor second side 402 are oriented tangentially to the annular well 412. In an alternate embodiment, each fin 308 or 408 may have a different orientation.

In the exemplary embodiment of FIG. 5, fins 508 and channels 510 have a curved shape which provides improved fluid impelling capabilities. A preferred amount of curvature of fins 508 may be determined based on the particular fluid engaged and the rotational speed range of the fins 508 by methods known in the art of fluid dynamics.

In FIG. 6, this exemplary embodiment includes fins 608 of different sizes and branching channels 610. The fins 608, channels 610, annular well 612, and all surfaces thereof, may be shaped and adapted to maximize heat transfer from the rotor assembly 162 to the fluid. In alternate embodiments, any of the embodiments of FIGS. 4–6 may have fins crossing the fins 608 shown. (See FIG. 20).

Figure 7:
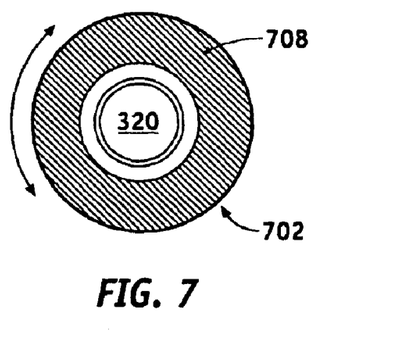
FIG. 7 is a view of still yet another exemplary second side of the seal rotor having a heat-transferring structure comprising a microstructure of a roughened surface.

In each of the embodiments depicted and described above, the rotor assembly second side 302, 402, 502, and 602 was at least partially roughened and had a plurality of fins 308, 408, 508, and 608 formed thereon. Alternatively, by controlling the radial length of the channels and controlling the channel width, the ratio of boundary layer thickness at fin trailing tip to channel width can be optimized to reduce the need for surface roughening. Optimization will result in additional machining of radial space instead of producing a roughened fractal surface but optimization can be achieved that maximizes the heat transferred to the fluid flowing across the fins and in the holes of the rotor. In an alternative embodiment, such as that shown in FIG. 7, the rotor assembly second side 702 has a roughened surface 708 and no fins 308 on the second side 702. As with prior embodiments, the rotor seal second side 702 may be roughened using any one of the previously mentioned processes and/or methods, and may form a fractal pattern.

Figure 8:
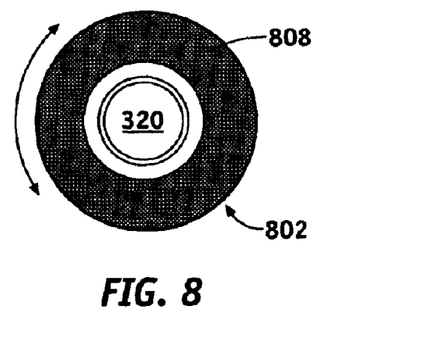
FIG. 8 is a view of yet still another exemplary second side of the seal rotor having a heat-transferring structure comprising holes.

Yet another alternative method of roughening the rotor assembly second side 802 is shown in FIG. 8. In accordance with this exemplary embodiment, a pattern of holes 808 is formed in the rotor assembly second side 802. The holes 808 may extend only partially through the rotor assembly 162. A wide range of hole patterns may be used, so long as the rotor assembly 162 remains balanced. In yet another alternate embodiment (not depicted), the holes 808 may be threaded, and bolts of a material with a very high thermal conductivity, such as gold, may be threaded therein so that the bolt shaft acts as high-conductivity thermal path and the bolt heads serve as fins 308.

Figure 9:
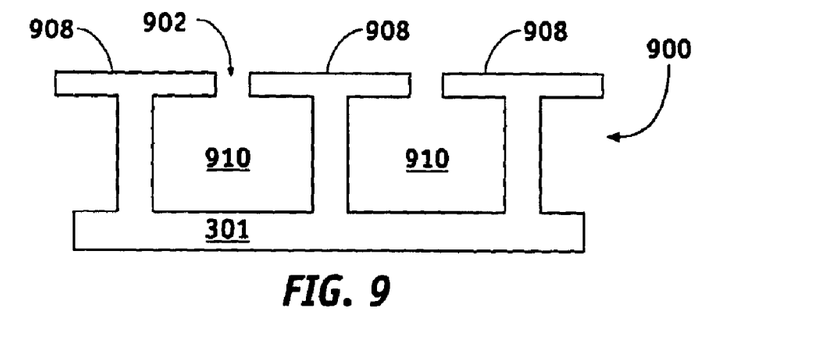
FIG. 9 is a partial edge elevation view of an exemplary seal rotor having fins with a T-shaped cross-section as heat-transferring structures.

The fins 308 may be of any one of numerous cross-sectional shapes. In the embodiment depicted in FIGS. 3A and 3B, the fins have a generally rectangular cross section. Some exemplary, and non-limiting, alternate cross sectional shapes are illustrated in FIGS. 9–12, some of which depict a roughened surface as well. FIGS. 9–12 are elevation views through a section B–B' as shown in FIG. 3B. In particular, FIG. 9 shows fins 908 with a "T"-shaped cross section, and with fins 908 and channels 910 all being the same size, shape, and orientation on a rotor body 301. As was previously noted, the present invention is not limited to fins 908 and channels 910 all being the same size, shape, or orientation on a single rotor assembly 162. Likewise, the cross-sectional size and shape may vary over the length of any fin 908.

Figure 10:
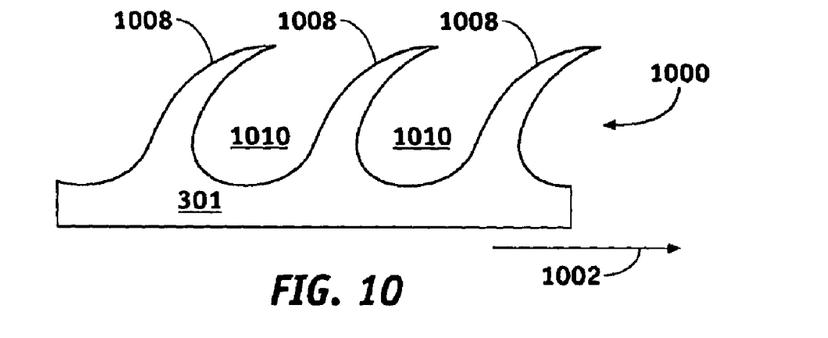
FIG. 10 is a partial edge elevation view of an exemplary seal rotor having fins with a curved cross-section as heat-transferring structures.

In FIG. 10 the fins 1008 are oriented for a rotor assembly 162 rotating in the direction indicated by arrow 1002. The fins 1008 impel fluid downward into channels 1010 where rotational motion of the rotor assembly 162 moves the fluid radially outward over the second-side surface of the rotor assembly 162. A cross-sectional shape of the fins 1008 may be determined for each set of fluid properties and velocity ranges for which an embodiment may be made, using methods known in the art of fluid dynamics.

Figure 11:
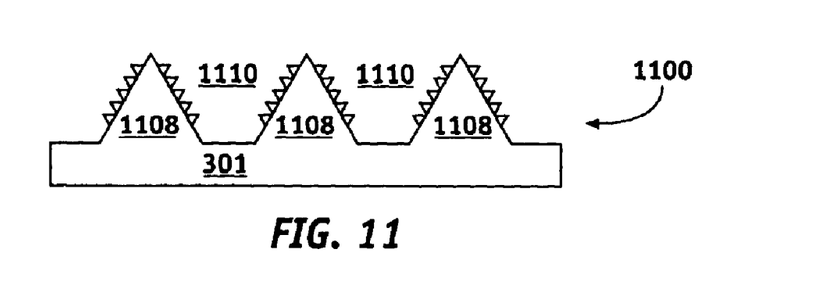
FIG. 11 is a partial edge elevation view of an exemplary seal rotor having fins with a triangular cross-section with additional triangular cross-sectioned heat-transfer structures forming fractal heat-transferring structures.
Figure 12:
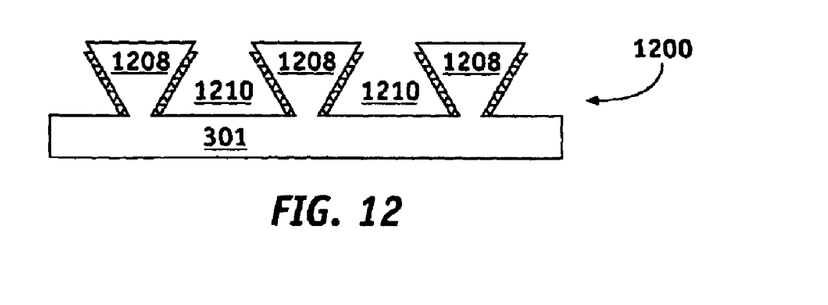
FIG. 12 is a partial edge elevation view of an exemplary seal rotor having fins with an inverted triangular cross-section with additional inverted triangular cross-sectioned heat-transfer structures forming fractal heat-transferring structures.

In FIG. 11, the exemplary cross sectional shape is substantially triangular and is roughened by including progressively smaller triangular-shaped protrusions on each fin 1108. It will be appreciated that the progressively smaller protrusions may be configured to form a fractal pattern. FIG. 12 depicts another exemplary fractal pattern for fins 1208 and channels 1210 based upon an inverted triangular cross section. An advantage of using the inverted triangular fins 1208 is the relatively short thermally conductive path through the rotor body 301 to the second side surface 300 and the larger area, as compared to embodiment 1100, for which a short thermally conductive path is available. The wider fin 1208 tops may assist in keeping fluid in the channel 1210 and moving radially, as preferred, instead of axially away from the rotor assembly 162.

Figure 13:
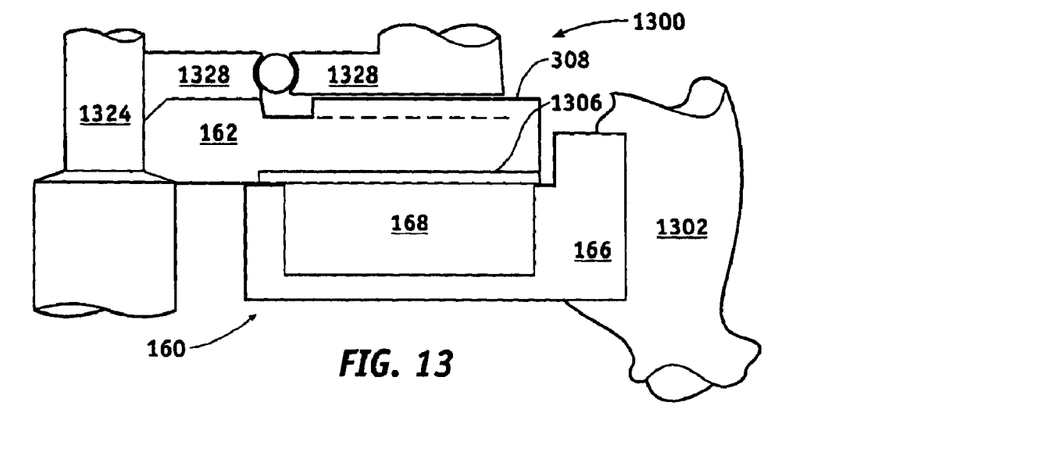
FIG. 13 is a partial elevation view of a seal rotor installed on a shaft and sealingly engaging a stator.

As was noted above, the seal rotor depicted herein is not limited for use in an ATS, but may be used in any one of various machines. FIG. 13 depicts an exemplary embodiment 1300 of a portion of a generic rotating machine and shows rotor assembly 162 in its relationship with stator assembly 160, with a shaft 1324 and with bearing 1328. In embodiment 1300, rotor assembly 162 is mounted proximate a bearing through which oil flows, thereby providing a cooling fluid to the second side of rotor assembly 162. In other embodiments, oil or oil aerosols may be the ambient fluid with no particular directionality other than that supplied by the rotor assembly 162. In a particular embodiment, a flow of oil may be directed onto the rotor assembly 162 from an oil pump, oil cooler, or a conduit. Other fluids than oil, such as hydraulic fluid and air, may be used as a cooling fluid for rotor assembly 162.

Stator assembly 160 includes seal case 166 mounted against rotation in stator casing 164 which is, in turn, mounted against rotation on web 1302. Web 1302 may be any part of a housing, or may be independent of a housing. For example, for a seal for a mixer shaft extending through the wall of a chemical vat, the vat wall would be web 1302.

Stator 168 is sealingly engaged by sealing surface 1306 on the first side of rotor assembly 162. Sealing surface 1306 may be metal plating, such as chromium, in an annular depression formed in the rotor first side. The design of the radial extent of the sealing surface 1306 depends at least partially upon the contact load on the seal 160, with higher loading requiring more sealing area.

Figure 14:
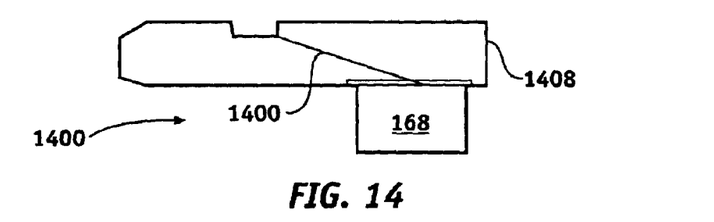
FIG. 14 is a partial elevation view of a seal rotor having a channel extending axially through the rotor.
Figure 15:
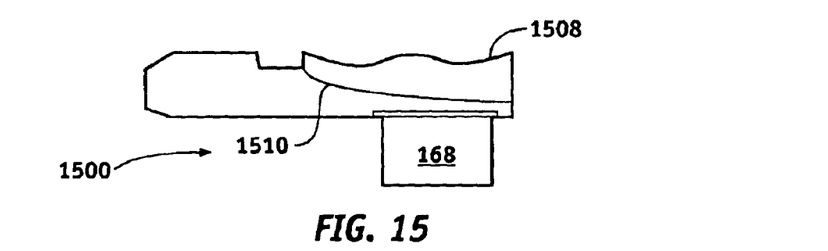
FIG. 15 is a partial elevation view of a seal rotor having a channel with a short thermal conductivity path and a shaped fin.
Figure 16:
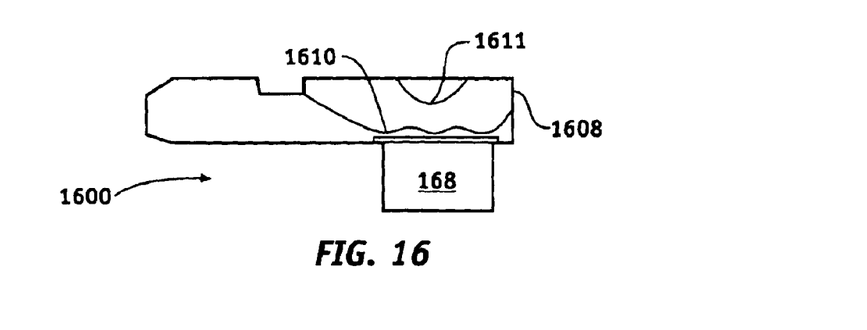
FIG. 16 is a partial elevation view of a seal rotor having a channel with a shaped deep channel and a fin having a flow-shaping structure.

Channels 310 are not limited to running parallel to the rotor first side 302. For example, FIG. 14 depicts exemplary embodiment 1400 having a channel 1410 extending axially through the rotor assembly to enable a cooling fluid, such as oil, to reach an outer annular region of the stator 168 for direct cooling of the stator 168. For further example, FIG. 15 depicts exemplary embodiment 1500 having a channel 1510 that deepens in the radially outward direction to provide a short thermal conduction path to the second side of rotor assembly 162. Fin 1508 illustrates generally that the fin 1508 may be shaped to adapt to proximate objects or for fluid dynamic purposes. For yet another example, FIG. 16 depicts exemplary embodiment 1600 having a channel 1610 that may minimize the thickness of the rotor assembly 162 above the stator 168 to provide a short thermal conduction path to the second side of rotor assembly 162. Fin 1608 may have flange 1611 which extends into channel 1610 to establish flow characteristics within the channel 1610.

Because it maximizes the heat transfer surface, many small fins 308 show significantly superior performance over a few large fins 308. Experimentation in an ATS application has shown that 20 radial fins 308 produce a reduction of 30 degrees Fahrenheit in seal rotor 301 temperature. Considerable reductions in stator sealing face temperatures may thus be obtained by the disclosed method of maximizing the heat transferred to the fluid flowing through the fins, channels, and holes by optimization of the 1) roughness/fractal nature of the surfaces in contact with the fluid, 2) the channel width vs boundary layer thickness, 3) surface area exposed to the fluid, thereby reducing coke formation and extending seal life.

Figure 17A:
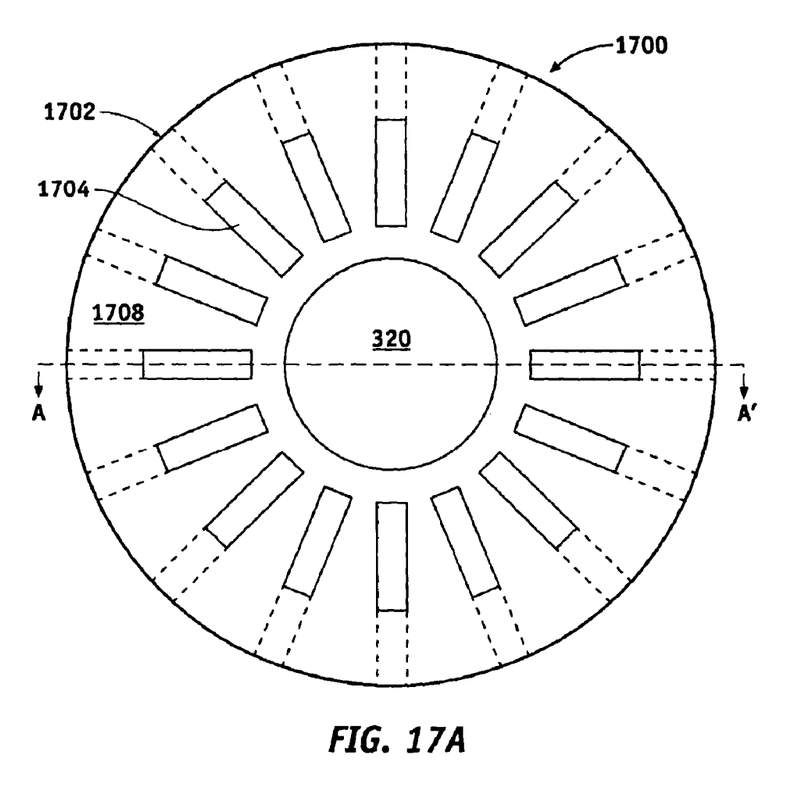
FIG. 17 is a view of still another exemplary second side of the seal rotor having a heat-transferring structure having slanted holes without a groove.
Figure 17B:
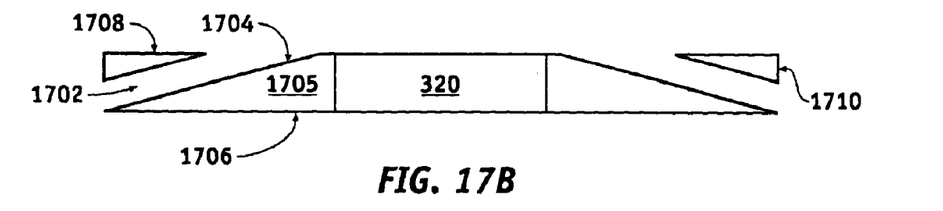

FIG. 17A and FIG. 17B show an exemplary embodiment of seal rotor second side 1700 having radial holes 1702 drilled through the outer peripheral surface 1710 of the rotor which penetrate through the rotor body 1705 to the rotor second side surface 1708. The holes 1702 form channels having a surface 1704, which may be roughened to improve heat transfer to a fluid flowing therein. In an alternate embodiment, holes 1702 may penetrate, at least partially, rotor first side surface 1706.

Figure 18A:
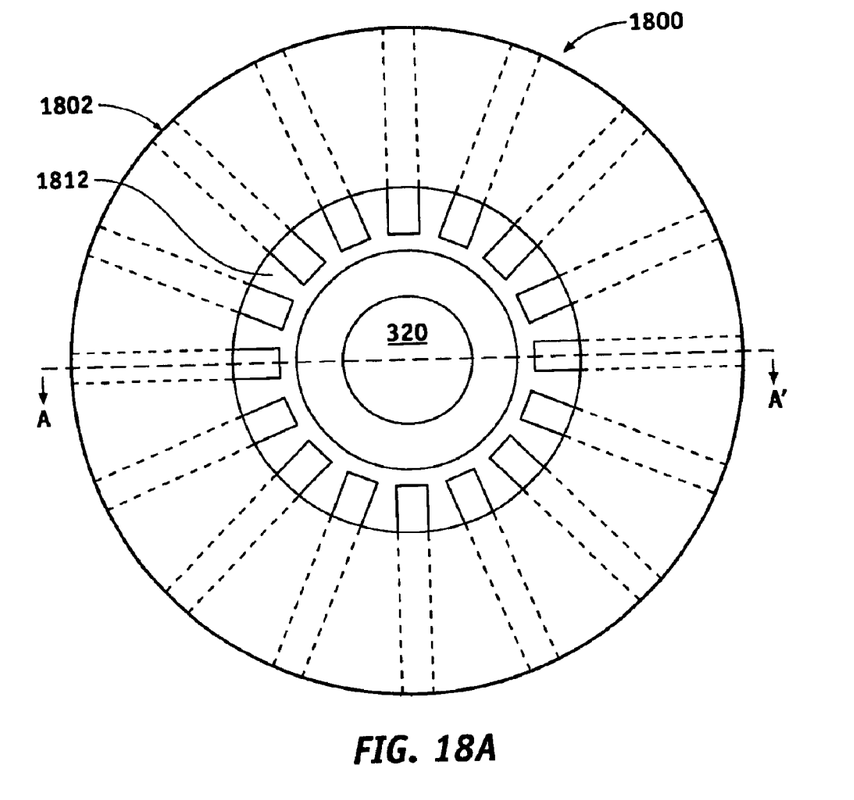
FIG. 18 is a view of still another exemplary second side of the seal rotor having a heat-transferring structure having straight holes intersecting a groove.
Figure 18B:
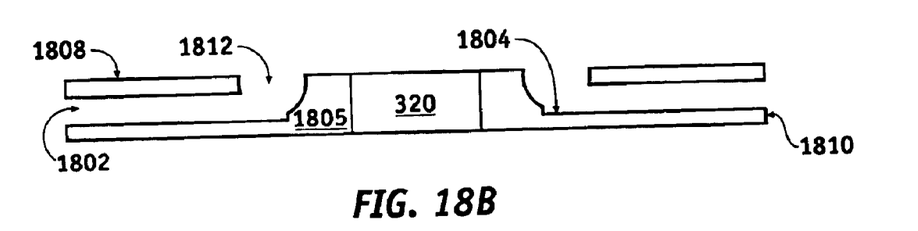

FIG. 18A and FIG. 18B show an exemplary embodiment of seal rotor second side 1800 having radial holes 1802 drilled through the outer peripheral surface 1810 of the rotor which penetrate through the rotor body 1805 to the annular channel 1812. The holes 1802 form channels having a surface 1804, which may be roughened to improve heat transfer to a fluid flowing therein. In an alternate embodiment, fins may be added to seal rotor second side 1800.

Figure 20:
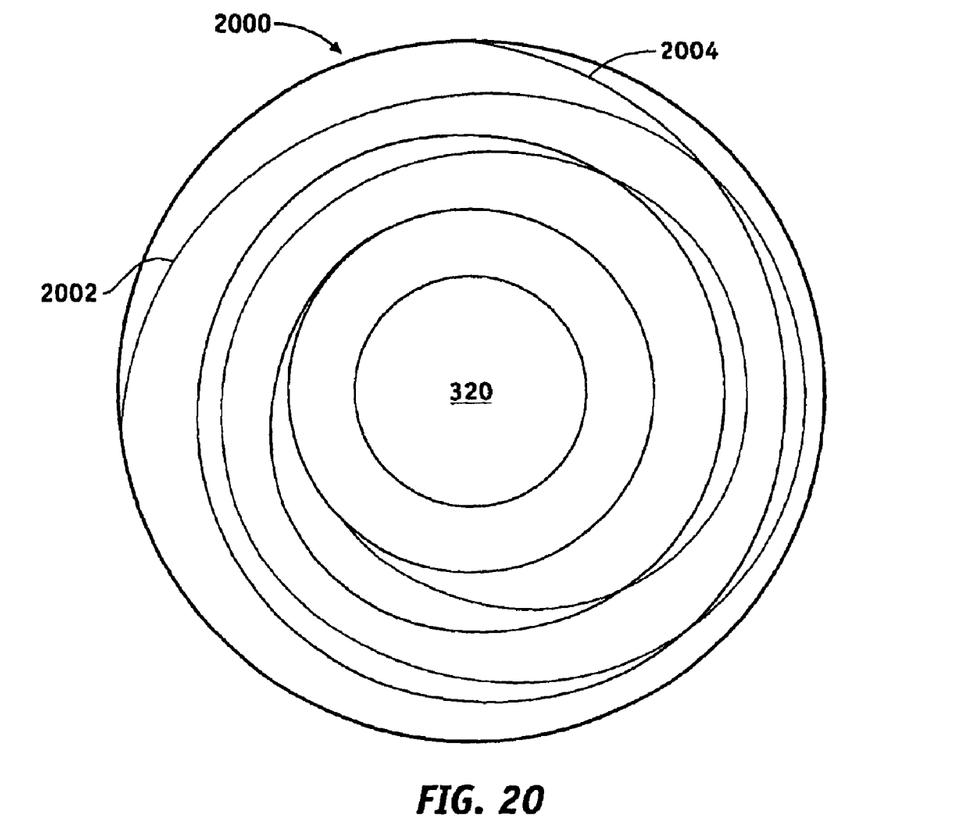
FIG. 20 is a view of still another exemplary second side of the seal rotor having a heat-transferring structure having a multiple start thread.

FIG. 19 shows a diagram of an exemplary embodiment of a seal rotor second side 1900 having a single spiral fin 1902. The fin 1902 is illustrated as having a triangular cross-section with a smooth filet between the base and the rotor surface, wherein the spiral line of FIG. 19 represents the apex of the fin 1902. Fin 1902 may be of any cross-sectional shape. In an alternate embodiment, a fin 1902 may be formed by machining a spiral groove in the seal rotor second side 1900. FIG. 20 shows a diagram of an exemplary embodiment of a seal rotor second side 2000 having two spiral fins 2002 and 2004 that are offset rotationally by approximately ninety degrees. Additional fins 2002 and 2004 and additional or alternate offsets may be used, or the direction of rotation of the threads may be reversed on alternating threads of a multi-start thread design resulting in a fin pattern similar to that shown in FIG. 20.

Figure 21:
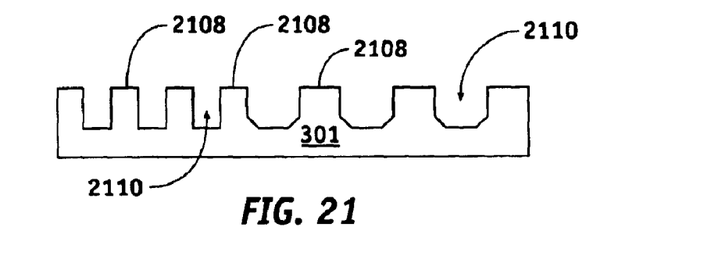
FIG. 21 is an edge elevation view showing cross sections of fins having different thicknesses on a single seal rotor.

FIG. 21 shows an exemplary section B–B' from FIG. 3B for an embodiment having fins 2108 and channels 2110 of different sizes on a second side of a single rotor body 301. The sizes and shapes of fins such as fins 2108 and of channels such as channels 2110 may be adapted to particular needs for seal cooling given available fluid properties and mechanical constraints. In a preferred embodiment using radial or tangential fins, each seal rotor has more than ten fins.

Figure 22:
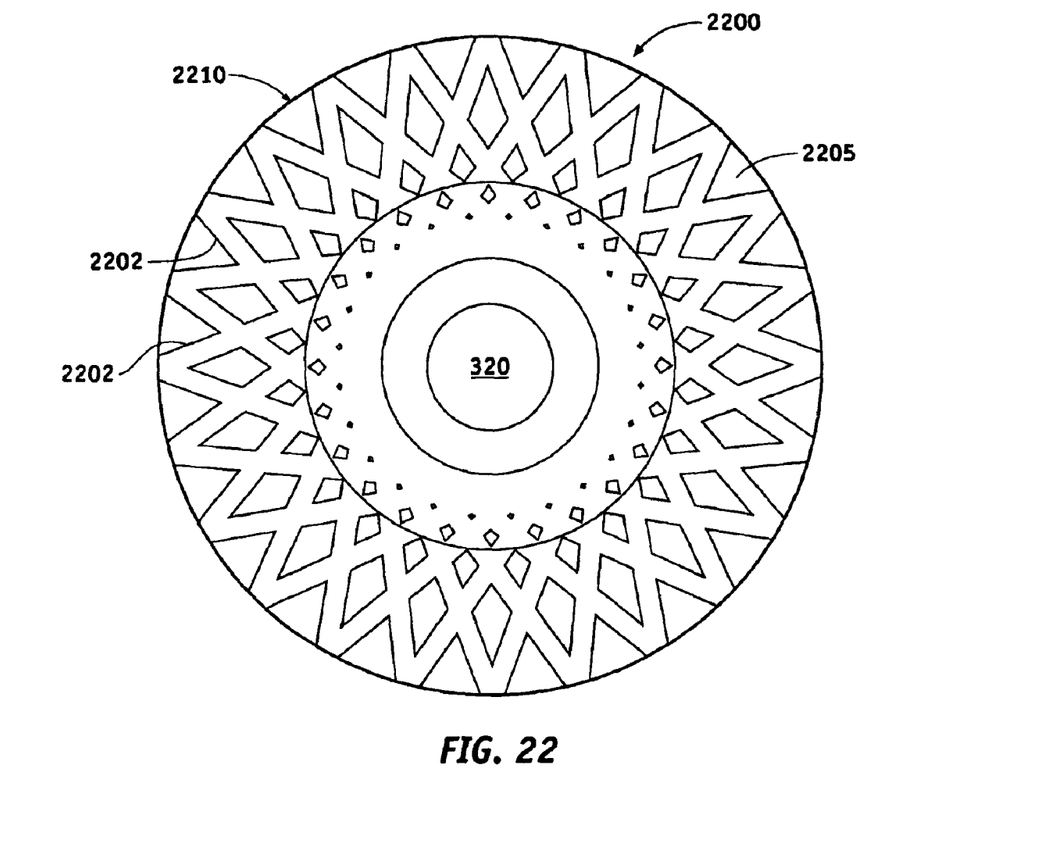
FIG. 22 is a view of still another exemplary seal rotor having a plurality of bores through the rotor body.

FIG. 22 is a diagram showing an exemplary pattern of holes 2202 through rotor body 2205 in an exemplary seal rotor second side 2200. The holes penetrate the outer peripheral surface 2210 of rotor body 2205 at a first hole end, extend through the rotor body 2205 and penetrate the outer peripheral surface 2210 at a far hole end. The herringbone pattern illustrated in FIG. 22 may also be used for fins.

It will be appreciated that there is significant economic advantage to combining film-riding technology with the fin technology disclosed herein to reduce the rate of oxidized oil filling of the hydrodynamic features of the film riding technologies. Oxidized oil filling of the hydrodynamic features of air film-riding seals has been noted in hardware returned from flight review and is a reliability and operating life concern for film-riding designs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An air turbine starter, comprising:
   a housing having a fluid inlet port, fluid outlet port, and a fluid flow passage extending therebetween;
   a turbine wheel having a turbine shaft rotationally mounted within the housing, the turbine wheel further having at least two turbine blades extending radially into the fluid flow passage; and
   a seal assembly mounted in the housing, the seal assembly including:
      a seal case mounted on the housing;
      a seal stator mounted within the seal case, the seal stator having at least a first face and a second face;
      a seal rotor mounted on the turbine shaft, said seal rotor having:
         a first side adapted to sealingly engage said seal stator first face; and
         a second side having at least a partially roughened surface and one or more fins thereon.

2. The air turbine starter of claim 1, wherein the roughened surface forms a fractal pattern on the seal rotor second side.

3. The air turbine starter of claim 1, wherein each fin forms a fractal pattern.

4. The air turbine starter of claim 1, wherein each fin is adapted to impel a fluid.

5. The air turbine starter of claim 4, wherein the seal rotor further comprises an annular well formed on the second side, and wherein each fin has a surface aligned substantially tangentially to the annular well.

6. The air turbine starter of claim 1, further comprising one or more channels formed on the seal rotor second side, each channel disposed between two fins.

7. The air turbine starter of claim 6, wherein each channel is configured such that a fluid flowing through each channel forms a boundary layer adjacent to the surface of the channel, the channel comprising a width greater than twice the thickness of the boundary layer of the fluid propelled.

8. The air turbine starter of claim 6, wherein said seal rotor has a circumferential arc and each channel has a width, the sum of the channel widths comprising between one percent and eighty percent of the circumferential arc of the seal rotor.

9. The air turbine starter of claim 6, wherein at least a portion of each channel extends axially through the rotor between the seal rotor first and second sides proximate a portion of the first face of the seal stator.

10. A seal assembly for sealing an opening through which a rotating shaft extends, comprising:
    a seal case mounted proximate the opening;
    a seal stator mounted within the seal case, the seal stator having at least a first face and a second face; and
    a seal rotor assembly adapted to the mounted on the rotating shaft, the seal rotor assembly having:
       a first side adapted to sealingly engage said seal stator first face; and
       a second side having at least a partially roughened surface and one or more fins thereon.

11. The seal assembly of claim 10, wherein the roughened surface forms a fractal pattern on the seal rotor second side.

12. The seal assembly of claim 10, wherein each fin forms a fractal pattern.

13. The seal assembly of claim 10, wherein each fin is adapted to impel a fluid.

14. The seal assembly of claim 13, wherein the seal rotor further comprises an annular well formed on the second side, and wherein each fin has a surface aligned substantially tangentially to the annular well.

15. The seal assembly of claim 10, further comprising one or more channels formed on the seal rotor second side, each channel disposed between two fins.

16. The seal assembly of claim 15, wherein each channel is configured such that a fluid flowing through each channel forms a boundary layer adjacent to the surface of the channel, the channel comprising a width greater than twice the thickness of the boundary layer of the fluid propelled.

17. The seal assembly of claim 15, wherein said seal rotor has a circumferential arc and each channel has a width, the sum of the channel widths comprising between one percent and eighty percent of the circumferential arc of the meal rotor.

18. The seal assembly of claim 15, wherein a portion of each channel extends axially through the rotor between the seal rotor first and second sides proximate a portion of the first face of the stator.

19. A rotor for a face seal having a stator including a sealing face, comprising:
    a substantially annular body having a first side and a second side, the first side adapted to sealingly engage the sealing face of the stator; and
    one or more fins and at least a partially roughened surface on the second side of the body.

20. The rotor of claim 19, wherein the fins are machined from the material of the seal rotor.

21. The rotor of claim 19, wherein the roughened surface forms a fractal pattern on the seal rotor second side.

22. The rotor of claim 19, wherein each fin forms a fractal pattern.

23. The rotor of claim 19, wherein each fin is adapted to impel a fluid.

24. The rotor of claim 23, wherein the seal rotor further includes an annular well formed on the second side, and wherein each fin has a surface aligned substantially tangentially to the annular well.

25. The rotor of claim 19, further comprising one or more channels formed on the seal rotor second side, each channel disposed between two fins.

26. The rotor of claim 25, wherein each channel is configured such that a fluid flowing through each channel forms a boundary layer adjacent to the surface of the channel, the channel comprising a width equal to or greater than twice the thickness of the boundary layer of the fluid propelled.

27. The rotor of claim 25, wherein a portion of each channel extends axially through the rotor between the seal rotor first and second sides proximate a portion of the first face of the stator.

28. The rotor of claim 19, further comprising one or more channels formed on the seal rotor second side, each channel of said one or more channels disposed between two fins, wherein said each channel is configured to vary in depth over its length.

29. The rotor of claim 19, wherein said seal rotor further comprises an outer peripheral surface between said first side and said second side and an annular well formed in said second side, the seal rotor further comprising one or more radial holes penetrating said outer peripheral surface.

30. The rotor of claim 29, wherein said holes penetrate through said seal rotor to said annular well.

31. The rotor of claim 29, wherein said holes penetrate through said seal rotor to at least one of said first side and said second side of said seal rotor.

32. The rotor of claim 19, further comprising one or more channels formed on the seal rotor second side by one or more spiral fins on said seal rotor second side.

33. The rotor of claim 19, further comprising one or more channels formed on the seal rotor second side, each channel disposed between two fins, said fins adapted to meet particular operational requirements for heat transfer and fluid flow control.

34. An apparatus having a shaft rotationally mounted therein and extending between a first volume and a second volume, the apparatus comprising:
    a web disposed between the first and second volumes, the web having an opening through which the shaft extends;
    a seal stator mounted on the web proximate the opening; and
    a seal rotor, mounted on the shaft and disposed at least partially within the first volume and proximate the opening, the seal rotor having a first side adapted to sealingly engage the seal stator and a second side having one or more fins and at least a partially roughened surface.

35. An apparatus having a shaft rotationally mounted therein and extending between a first volume and a second volume, the apparatus comprising:
    a web disposed between the first and second volumes, the web having an opening through which the shaft extends;
    a seal stator mounted on the web proximate the opening; and
    a seal rotor, mounted on the shaft and disposed at least partially within the first volume and proximate the opening, the seal rotor having a first side adapted to sealingly engage the seal stator, a second side having more than ten fins, a partially roughened surface, and a circumferential arc.

36. The apparatus of claim 35, wherein said second side of said seal rotor comprises a plurality of channels between said more than ten fins, each channel having a width, the sum of all channel widths comprising between one percent and eighty percent of said circumferential arc.

37. An apparatus having a shaft rotationally mounted therein and extending between a first volume and a second volume, the apparatus comprising:
    a web disposed between the first and second volumes, the web having an opening through which the shaft extends;
    a seal stator mounted on the web proximate the opening; and
    a seal rotor, mounted on the shaft and disposed at least partially within the first volume and proximate the opening, the seal rotor having a first side adapted to sealingly engage the seal stator, a second side having a partially roughened surface, a circumferential arc, and a plurality of channels, each channel having a width, the sum of all said widths of said channels comprising between one percent and eighty percent of said circumferential arc.

38. The apparatus of claim 37, wherein each two channels of said plurality of channels are separated by a fin, said seal rotor second side comprising more than ten fins.

39. The apparatus of claim 37, wherein the first aide of the seal rotor is adapted to generate a fluid film between the stator sealing face from the rotor first side when said rotor rotates.

40. The apparatus of claim 37, wherein the stator has a stator sealing face adapted to generate a fluid film between said stator sealing face and the rotor first side when said rotor rotates.

41. In an air turbine starter including a housing, a turbine wheel having a turbine shaft rotationally mounted within the housing, a seal rotor mounted on the turbine shaft, and a seal stator assembly mounted to the housing and surrounding the shaft and having at least a portion thereof sealingly engaging a face of the seal rotor, a method of modifying the air turbine starter, the method comprising:
    removing the seal rotor from the turbine shaft; and
    mounting a new seal rotor on the turbine shaft, wherein the new seal rotor assembly includes said seal rotor having:
        a first side adapted to sealingly engage said seal stator first face; and
        a second side having at least a partially roughened surface and one or more fins thereon.

* * * * *